(12) United States Patent
Adenau

(10) Patent No.: US 10,111,309 B2
(45) Date of Patent: Oct. 23, 2018

(54) LIGHTING CONTROL CONSOLE HAVING A SLIDE CONTROL

(71) Applicant: MA Lighting Technology GmbH, Waldbüttelbrunn (DE)

(72) Inventor: Michael Adenau, Würzburg (DE)

(73) Assignee: MA LIGHTING TECHNOLOGY GMBH, Waldbüttelbrunn (DE)

( * ) Notice: Subject to any disclaimer, the term of this patent is extended or adjusted under 35 U.S.C. 154(b) by 0 days.

(21) Appl. No.: 15/869,891

(22) Filed: Jan. 12, 2018

(65) Prior Publication Data

US 2018/0206308 A1    Jul. 19, 2018

(30) Foreign Application Priority Data

Jan. 18, 2017   (DE) .................... 20 2017 100 247 U (51) Int. Cl.
*H05B 37/02*    (2006.01)
*G06F 3/03*    (2006.01)
(Continued)

(52) U.S. Cl.
CPC .......... *H05B 37/029* (2013.01); *G05G 1/025* (2013.01); *G06F 3/03* (2013.01); *H01H 15/04* (2013.01); *H01H 15/10* (2013.01); *H05B 37/0245* (2013.01); *F16H 19/06* (2013.01); *F16H 2019/0686* (2013.01); *G05G 2700/02* (2013.01); *G05G 2700/16* (2013.01)

(58) Field of Classification Search
CPC  H05B 33/08; H05B 33/0809; H05B 33/0815; H05B 33/0848; H05B 33/0884; H05B 33/0896; H05B 33/0863; H05B 37/02; H05B 37/029; H05B 37/0254; H01H 15/04; H01H 15/10; G05G 1/025; G05G 2700/02; G05G 2700/16; F16H 19/06; F16H 2019/0686
USPC ....... 315/151–153, 291, 297, 308, 312, 316, 315/320
See application file for complete search history.

(56) References Cited

U.S. PATENT DOCUMENTS 4,173,941 A * 11/1979 Castagna ............. H05K 5/0017
                                                    116/278
9,402,291 B1    7/2016 Adenau
(Continued)

FOREIGN PATENT DOCUMENTS

| DE | 102008030920 A1 | 1/2010 |
| EP | 1784058 A2 | 5/2007 |
| WO | 9512877 A1 | 5/1995 |

OTHER PUBLICATIONS

European Patent Office, Search Report, Application No. 17203552, dated Apr. 20, 2018, 2 pages.

*Primary Examiner* — Jimmy Vu
(74) *Attorney, Agent, or Firm* — Quarles & Brady LLP (57) ABSTRACT

A lighting control console for controlling a lighting system includes digital adjusting commands being generated in the lighting control console that are transmitted to the lighting system via data links. The lighting control console includes at least one slide control for inputting operating commands via linear displacement of a control knob protruding from the upper side of the console housing. The upper side of the console housing includes a slit for each slide control. The slide control is fastened to said electronic circuit board and not to any fastening point on the console housing.

10 Claims, 7 Drawing Sheets

(51) Int. Cl.
*G05G 1/02* (2006.01)
*H01H 15/04* (2006.01)
*H01H 15/10* (2006.01)
*F16H 19/06* (2006.01)

(56) References Cited

U.S. PATENT DOCUMENTS

2007/0103447 A1* 5/2007 Varian .................. G06F 3/0219
345/173
2010/0001665 A1   1/2010 Brockmann

* cited by examiner

LIGHTING CONTROL CONSOLE HAVING A SLIDE CONTROL

CROSS-REFERENCE TO RELATED APPLICATIONS

This application claims priority to German Utility Model Application No. 20 2017 100 247.0 filed on Jan. 18, 2017. The contents of the priority application are hereby incorporated by reference as if set forth in their entirety herein.

BACKGROUND

Generic lighting control consoles serve for controlling lighting systems, as they are used for concert stages, for example. These lighting systems regularly comprise a plurality of lighting devices, such as stage lights, said lighting devices in their own right often being able to be switched between a plurality of lighting conditions, such as different colors. These different lighting conditions of the lighting devices connected to the respective lighting control console can be controlled via preprogrammed parameters in the lighting program of the lighting control console. For this purpose, common lighting systems can comprise up to several thousand lighting devices. In order to be able to control such complex lighting systems, the generic lighting control consoles are equipped with a digital processor which enables digital data and signal processing. In order to store the control data, a digital memory is commonly provided which enables in particular storing or archiving lighting programs. For protecting the electric and electronic components of the lighting control console, the corresponding components are installed in a console housing which shields the electric and electronic components of the lighting control console towards the exterior.

For programming the lighting program or rather for controlling the lighting program during operation, the user has to input operating commands as input values. These operating commands can be a selection of a specific lighting device or the setting of a specific parameter, for example. In order to be able to input these operating commands, mechanical operating elements, such as buttons, rotary controls (encoders) or slide controls, are provided in known lighting control consoles, said operating elements being arranged in an operating panel on the upper side of the console housing. The operating commands allocated to the individual operating elements can be altered by adequately switching the menu in order to be able to program and control correspondingly complex lighting programs.

The slide controls, in particular, are immensely important when programming the lighting programs. The slide controls comprise a control knob which protrudes from the console housing on the upper side of the lighting control console and which can be linearly displaced by the user for setting certain programming parameters. A slit is provided in the console housing itself for each slide control, the control knob on the outer side of the console housing being connected to the slide control, which is installed in the housing itself, via said slit. In the known lighting control consoles, the slide controls are fastened to the inner side of the wall of the console housing. For this purpose, the wall of the console housing can comprise two bores for each slide control, for example, through which the slide control can then be screwed onto the inner side of the wall of the console housing. This type of fastening the slide control on the wall of the console housing has the disadvantage that the wall of the console housing has to comprise a plurality of holes in order to enable fastening the slide controls on the wall. Such holes in the wall of the console housing are, however, generally undesirable since they absolutely must be covered in order to prevent dust from getting into the interior of the console housing and moreover to provide an adequate visual appearance in the operating panel of the console housing.

SUMMARY

Starting from this state of the art, it is therefore the object of the invention at hand to propose a new lighting control console which avoids the problems described above.

The object is attained by a lighting control console according to the teachings of claim 1.

Advantageous embodiments of the invention are the subject matter of the dependent claims.

The lighting control console according to the invention is based on the fundamental idea that it is not the wall of the console housing that is used for fastening the slide controls but rather at least one electronic circuit board provided in the interior of the console housing is used. The slide controls are fastened to the electronic circuit board for this purpose and do not comprise any fastening points on the console housing at all so that in particular fastening holes for fastening the slide controls in the wall of the console housing can be omitted. The electronic circuit board itself is then suitably fastened in the interior of the console housing and thus provides a sufficient mechanical fastening for the slide controls on the console housing. The console housing itself then merely comprises the slits in order to be able to connect the control knobs of the slide controls, which are to be mounted on the outer side of the console housing, to the slide control itself.

In order to be able to exactly position the slide controls with as little play as possible on the electronic circuit board in a simple manner, it is particularly advantageous if the electronic circuit board comprises at least one hole into which the slide control is inserted. For this purpose, either a large hole can be provided for all slide controls together or a hole complementary in form can be provided for each slide control individually. Via this form fit between the cutout in the electronic circuit board on the one hand and the circumference of the slide control on the other hand, an exact positioning of the slide control on the electronic circuit board and thus an exact positioning of the slide control in the console housing can be guaranteed without further ado.

In which manner the mechanical connection between the slide control on the one hand and the electronic circuit board on the other hand is realized is generally arbitrary. According to a preferred embodiment, it is intended that the slide control comprises a fastening tab at least on a front side, which enables fastening the slide control to the electronic circuit board. Insofar as the electronic circuit board for receiving the slide controls comprises holes, it is advantageous in this context if the fastening tab overlaps the hole from the side.

For fixing the fastening tabs to the electronic circuit board, a hole can be provided in the fastening tab. In this manner, the fastening tab can be easily screwed on when mounting the slide control to the electronic circuit board.

In order to be able to set the insertion depth of the slide controls when mounting the same in the hole of the electronic circuit board in such a manner that the slide control protrudes somewhat on the upper side as well as on the lower side of the electronic circuit board, it is particularly advantageous if the fastening tab comprises an offset.

Which type of slide control is fastened to the electronic circuit board of the lighting control console in the manner according to the invention is generally arbitrary. In particular for slide controls having an electric drive motor, by means of which the slide control can also be motor-driven and can thus be remote-controlled, the type of fastening according to the invention is advantageous since these slide controls require a high mechanical strength of fixation in the lighting control console.

With regard to preventing disruptions of the lighting control console, it is of great significance to prevent impurities and dust from penetrating the housing of the slide control as much as possible. In particular for slide controls containing a sliding contact, dust presents a great hazard to the functionality of the slide control. In order to be able to translate the movements of the control knob onto the sliding contact, the housing of the slide control must comprise a slit through which a coupling element, which connects the control knob to the sliding contact, is passed. In order to minimize the risk of dust and impurities getting into the interior of the housing of the slide control as much as possible, it is therefore particularly advantageous if the opening formed in the housing of the slide control by the slit is oriented horizontally to the side of the lighting control console or vertically to the bottom of the lighting control console. By this horizontal or downward orientation of the opening in the housing of the slide control, it is prevented that dust and impurities penetrate the housing of the slide control via the opening due to the effects of gravity.

With regard to enabling easy electric contacting of the slide control to the other electronic components of the lighting control console, it is particularly advantageous if the slide control comprises a plug connection having several contact elements. A plug complementary in function can then be plugged onto this plug contact in order to electrically connect the entire slide control in the lighting control console in a single assembly movement in this manner.

With regard to the electric functionality, it is particularly advantageous if the plug contact is fastened on an electronic circuit board of the slide control.

Insofar as the slide control comprises an electronic circuit board having a plug contact, the drive motor of the slide control should preferably be electrically contacted via the electronic circuit board.

An embodiment of the invention is schematically illustrated in the drawings and is further described in an exemplary manner in the following.

DETAILED DESCRIPTION

Figure 1:
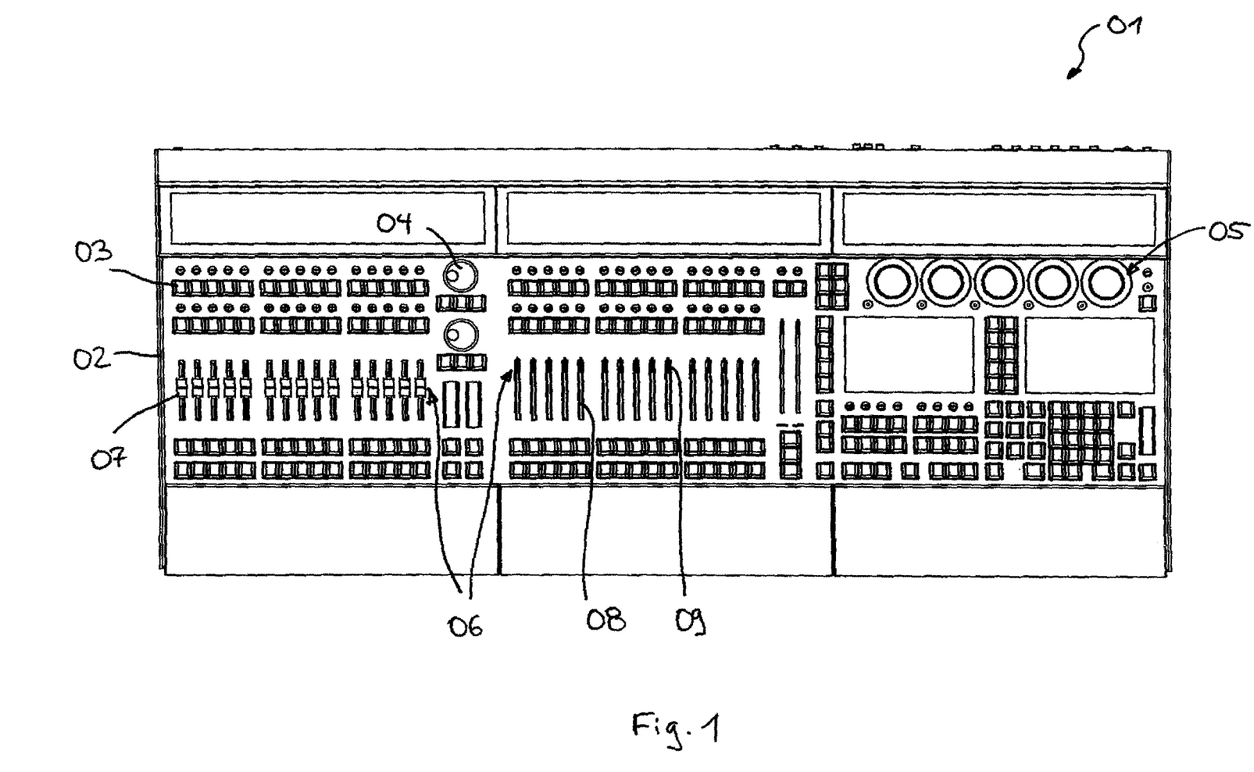
FIG. 1 illustrates a lighting control console for controlling a lighting system having several slide controls in a top view.

FIG. 1 illustrates a lighting control console 01 for controlling a lighting system, which is not further illustrated, in a top view. In order for the user to input operating commands when programming lighting programs, a plurality of mechanical operating elements, such as buttons 03, rotary controls 04, dual encoders 05 and slide controls 06, are installed in the console housing 02. In the illustration according to FIG. 1, only the parts of the slide controls protruding from the upper side of the console housing 02, i.e. the control knobs 07 or the coupling elements 09 protruding through slits 08 when the control knobs 07 are disassembled, can be seen.

Figure 2:
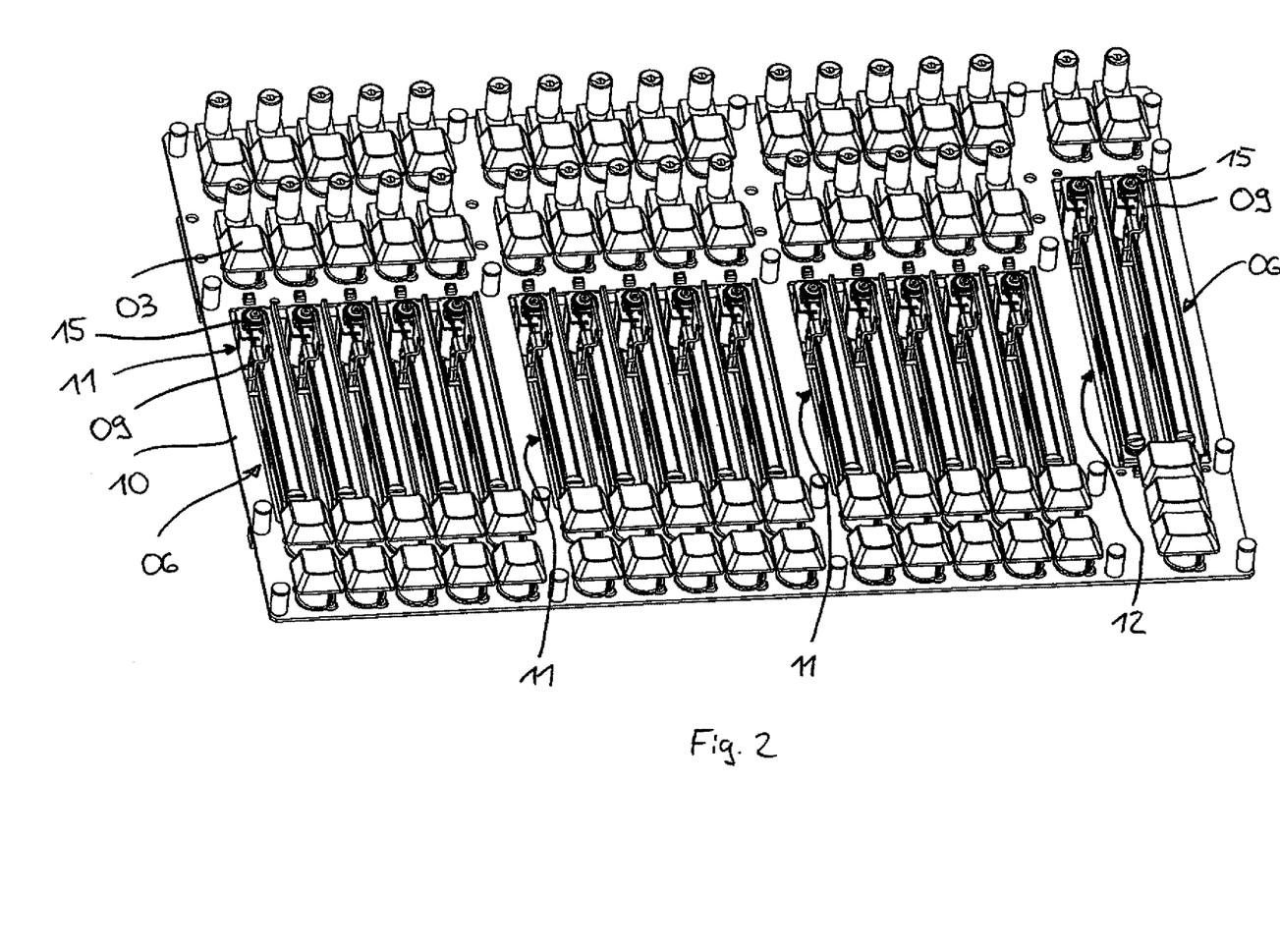
FIG. 2 illustrates an electronic circuit board fastened in the interior of the lighting control console according to FIG. 1 and having several slide controls mounted thereto in a top view.

FIG. 2 illustrates an electronic circuit board 10 which is installed in the interior of the console housing 02 and in which several slide controls 06 are installed along with several buttons 03. In the illustration according to FIG. 2, the control knobs 07 are disassembled and thus the coupling elements 09 can be seen.

The electronic circuit board 10 comprises three holes 11 and one hole 12, which each form a fastening panel for fastening five and two slide controls 06, respectively. When mounting the slide controls 06 in the holes 11 and 12, respectively, the slide controls 06 are inserted into the holes 11 from the bottom and are subsequently screwed onto the electronic circuit board from the bottom.

Figure 3:
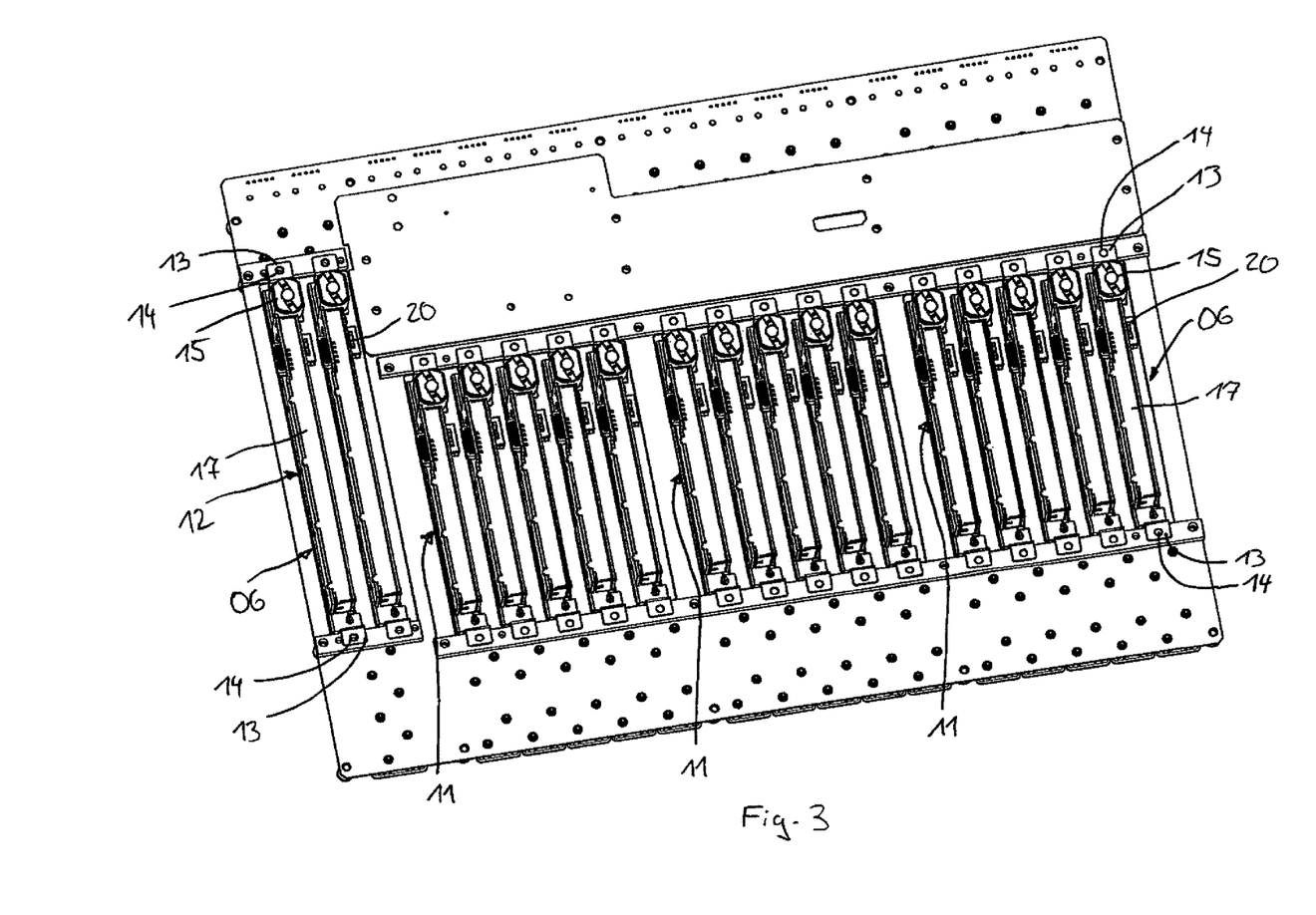
FIG. 3 illustrates the electronic circuit board having the slide controls fastened thereto in a bottom view.

FIG. 3 illustrates the electronic circuit board 10 in a bottom view. The holes 11 and 12, respectively, having the corresponding slide control 06 inserted therein, can be seen. Fastening tabs 13 serve for fastening the slide controls 06 to the electronic circuit board 10, said fastening tabs 13 each being arranged on the slide controls 06 on the front side. Each fastening tab 13 comprises a hole 14 via which the slide controls 06 can be screwed to the electronic circuit board 10.

Figure 4:
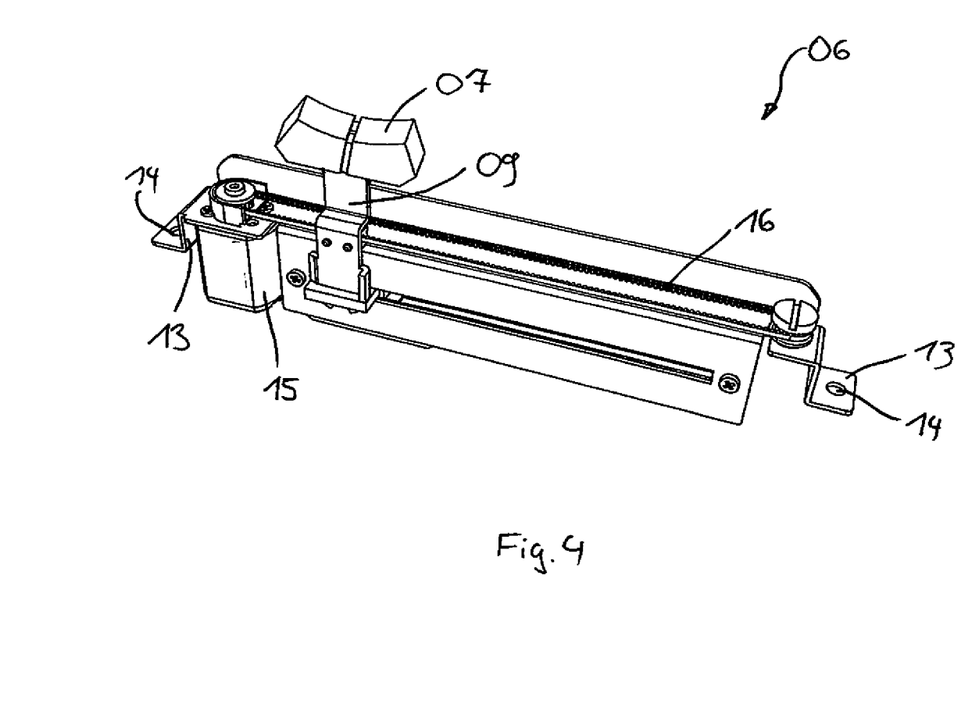
FIG. 4 illustrates one of the slide controls according to FIG. 2 in a disassembled state in a perspective side view.

FIG. 4 illustrates a slide control 06 having the control knob 07 plugged onto the coupling element 09 in a perspective view. The two fastening tabs 13 being arranged on the front side and having the holes 14 can be seen. Via a corresponding offset of the fastening tabs 13 it is attained that part of the slide control 06 correspondingly protrudes from the upper side as well as from the lower side of the electronic circuit board 10 when the slide controls 06 are mounted on the electronic circuit board 10.

The slide control 06 is equipped with a drive motor 15 which can drive the coupling element 09 via a drive belt 16. In this manner, the slide control 06 can be displaced not only manually but can also be displaced via remote control of the drive motor 15.

Figure 5:
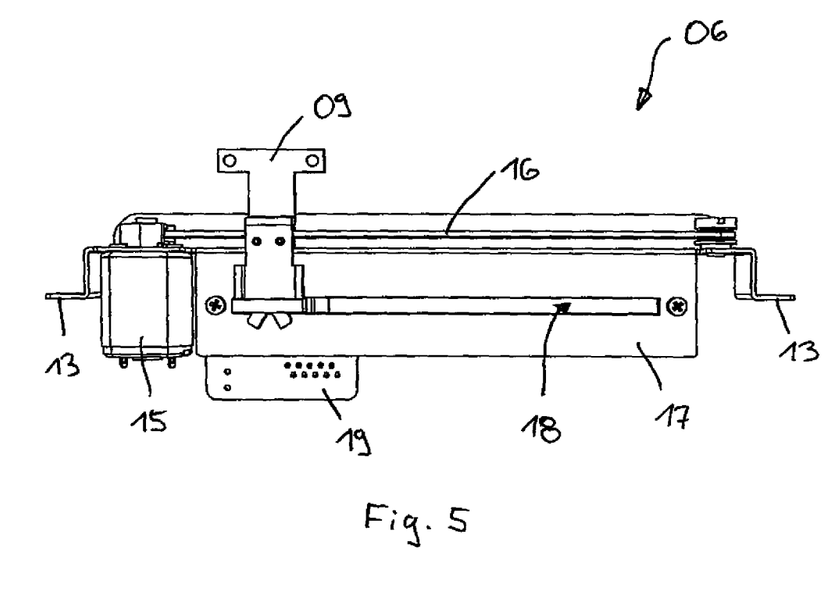
FIG. 5 illustrates the slide control according to FIG. 4 in a side view.

FIG. 5 illustrates the slide control 06 in a side view, when the control knob 07 has been removed. The housing 17 of the slide control 06 comprises a slit 18 through which the coupling element 09 is passed from the exterior so as to be able to connect the sliding element arranged in the interior of the housing 17 to the part of the coupling element 09 extending outside of the housing 17 and in particular to the control knob 07 as well. The electronic components of the slide control 06 are installed on an electronic circuit board 19.

Figure 6:
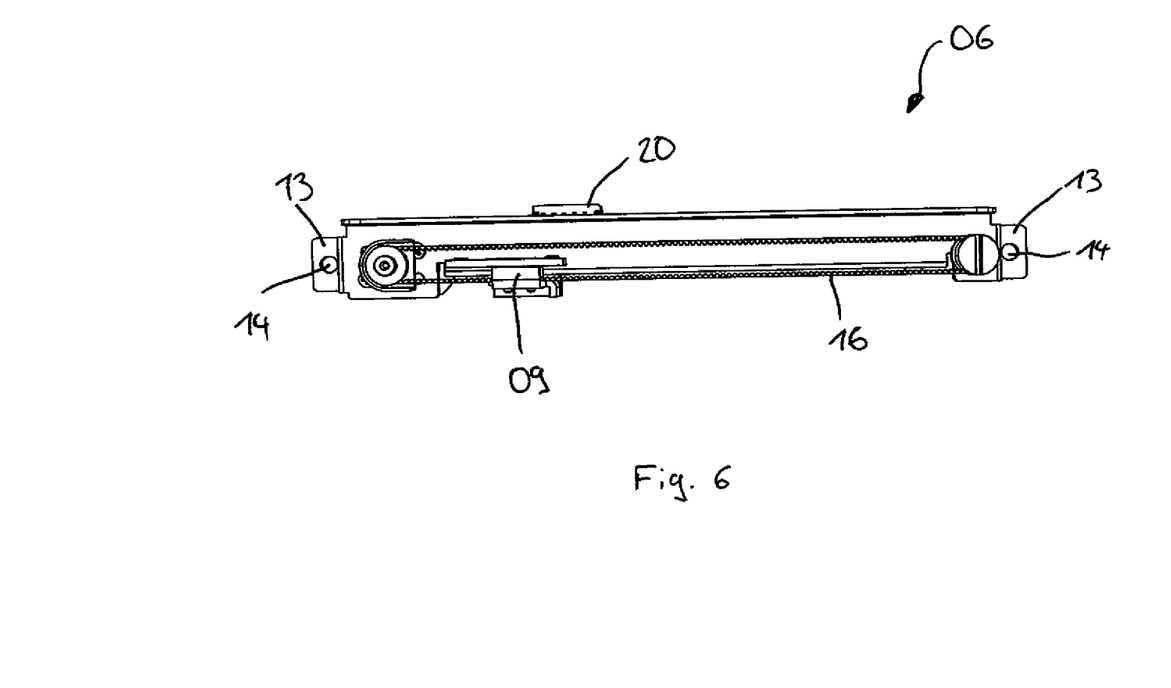
FIG. 6 illustrates the slide control according to FIG. 4 in a top view.

FIG. 6 illustrates the slide control 06 in a top view. On the side of the slide control 06, a plug contact 20 can be seen, onto which a plug complementary in function can be plugged for electrically contacting the slide control 06 in the lighting control console 01. The plug contact 20 is installed on the electronic circuit board 19.

Figure 7:
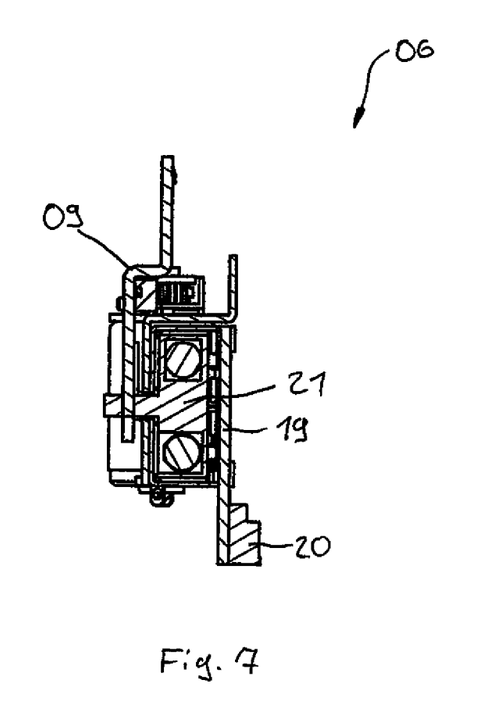
FIG. 7 illustrates the slide control according to FIG. 4 in a cross-sectional view.

FIG. 7 illustrates the slide control 06 in a cross-sectional view. The coupling element 09 and the sliding contact 21 installed in the interior of the housing 17 can be seen. The sliding contact 21 is also contacted via the electronic circuit board 19 and can be connected to the electronics of the lighting control console 01 via the plug contact 20.

The invention claimed is:

1. A lighting control console for controlling a lighting system, includes digital adjusting commands being generated in the lighting control console, said adjusting commands being able to be transmitted to the lighting devices of the lighting system via data links, said lighting control console comprising at least one digital processor and at least one digital memory for generating, managing and storing the adjusting commands, and said digital processor and said digital memory being arranged in a console housing, and said lighting control console comprising at least one slide control at which operating commands are being input by the user via linear displacement of a control knob protruding from the upper side of the console housing, and said upper side of the console housing comprising a slit for each slide control, said control knob being connected to said slide control via said slit,
wherein
at least one electronic circuit board is provided in the console housing, the slide control being fastened to said electronic circuit board and not comprising any fastening point on the console housing.

2. The lighting control console according to claim 1, wherein
the electronic circuit board comprises at least one hole in which the slide control is inserted.

3. The lighting control console according to claim 1, wherein
the slide control comprises a fastening tab at least on a front side, the slide control being able to be fastened to the electronic circuit board by means of said fastening tab.

4. The lighting control console according to claim 3, wherein
the fastening tab comprises a hole via which the slide control is screwed onto the electronic circuit board.

5. The lighting control console according to claim 3, wherein
the fastening tab has an offset.

6. The lighting control console according to claim 1, wherein
an electric drive motor is provided at the slide control to drive the slide control.

7. The lighting control console according to claim 1 wherein
a sliding contact is provided in the housing of the slide control, the housing of the slide control comprising a slit through which a coupling element is passed, said coupling element connecting the control knob to the sliding contact, the opening, which is formed in the housing of the slide control by the slit, being oriented horizontally to the side of the lighting control console or vertically to the bottom of the lighting control console.

8. The lighting control console according to claim 1, wherein
the slide control comprises a plug contact having several contact elements, a plug complementary in function being able to be plugged onto said plug contact for electrically contacting the slide control to the lighting control console.

9. The lighting control console according to claim 8, wherein
the plug contact is fastened on an electronic circuit board of the slide control.

10. The lighting control console according to claim 1, wherein
the drive motor is connected to the electronic circuit board of the slide control for producing an electric contact.

\* \* \* \* \*